US009075690B2

(12) United States Patent
Natchadalingam et al.

(10) Patent No.: US 9,075,690 B2
(45) Date of Patent: *Jul. 7, 2015

(54) AUTOMATICALLY AND SECURELY CONFIGURING AND UPDATING VIRTUAL MACHINES

(71) Applicant: International Business Machines Corporation, Armonk, NY (US)

(72) Inventors: Manikandan Natchadalingam, Bangalore (IN); Pradeep Patel, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,264

(22) Filed: Oct. 3, 2013

(65) Prior Publication Data

US 2014/0033194 A1 Jan. 30, 2014

Related U.S. Application Data

(63) Continuation of application No. 12/984,243, filed on Jan. 4, 2011, now Pat. No. 8,578,376.

(51) Int. Cl.
*G06F 9/455* (2006.01)
*G06F 9/445* (2006.01)

(52) U.S. Cl.
CPC .............. *G06F 8/65* (2013.01); *G06F 9/45533* (2013.01); *G06F 9/45558* (2013.01)

(58) Field of Classification Search
None
See application file for complete search history.

(56) References Cited

U.S. PATENT DOCUMENTS

| | | |
|---|---|---|
| 2007/0050426 A1 | 3/2007 | Dubal et al. |
| 2007/0240149 A1 | 10/2007 | Cromer et al. |
| 2008/0244553 A1 | 10/2008 | Cromer et al. |
| 2009/0138870 A1 | 5/2009 | Shahindoust et al. |
| 2009/0150878 A1 | 6/2009 | Pathak et al. |
| 2009/0178033 A1 | 7/2009 | Challener et al. |
| 2009/0217255 A1 | 8/2009 | Troan |
| 2010/0088397 A1 | 4/2010 | Jaudon et al. |
| 2010/0088500 A1 | 4/2010 | Ball et al. |
| 2012/0174095 A1 | 7/2012 | Natchadalingam et al. |

OTHER PUBLICATIONS

Bellissimo et al., Secure Software Updates: Disappointments and New Challenges, HotSec '06: 1st USENIX Workshop on Hot Topics in Security, pp. 37-43.

(Continued)

*Primary Examiner* — Mengyao Zhe
(74) *Attorney, Agent, or Firm* — Schmeiser, Olsen & Watts; John Pivnichny

(57) ABSTRACT

An approach for automatically and securely updating software on a virtual machine (VM) is presented. A current version of the software on the VM is determined to not match an updated version of the software. With a proxy update server connected to a network and without the VM being connected to the network, the updated version of the software is downloaded, stored and pushed to the VM by using a virtualized mounted drive, the updated version is installed on the VM to replace the current version, and a confirmation indicating the installation is received. An update of the software is provided dynamically via a connectivity of the proxy update server to the network while the VM is prevented from being infected with a virus that requires a connection to the VM through the network.

20 Claims, 5 Drawing Sheets

(56) References Cited

OTHER PUBLICATIONS

Chen et al., Live Updating Operating Systems Using Virtualization, VEE '06 Jun. 14-16, 2006 Ottawa, Ontario, Canada © 2006 ACM 1-59593-332-6/06/0006, pp. 35-44.

Office Action (Mail Date Dec. 18, 2012) for U.S. Appl. No. 12/984,243; Filing Date Jan. 4, 2011.
Amendment filed Mar. 20, 2013 in response to Office Action (Mail Date Dec. 18, 2012) for U.S. Appl. No. 12/984,243; Filing Date Jan. 4, 2011.
Notice of Allowance (Mail Date Jun. 27, 2013) for U.S. Appl. No. 12/984,243; Filing Date Jan. 4, 2011.

AUTOMATICALLY AND SECURELY CONFIGURING AND UPDATING VIRTUAL MACHINES

This application is a continuation application claiming priority to Ser. No. 12/984,243 filed Jan. 4, 2011, now U.S. Pat. No. 8,578,376 issued Nov. 5, 2013.

FIELD OF THE INVENTION

The present invention relates to a data processing method and system for managing updates to virtual machines, and more particularly to a secure hypervisor-based technique for updating and configuring software and operating systems running on virtual machines.

BACKGROUND

A vulnerability detected in an operating system or software running on a computer is resolved by installing an update provided over a network, where the update requires real time network connectivity with the download server that provides the update. The computer running the vulnerable version of the operating system or software is compromised when the computer is connected to an infected network or an infected mass storage device. Known solutions include: (1) reformatting the computer and installing the updated operating system or software and (2) running anti-virus tools and quarantining an infected file, which may also require reformatting the computer when system files are corrupted. Furthermore, there is no way to assure that a version of an operating system and software is the latest version when a machine is first connected to the network. A known solution includes using a removable drive or manually copying an update of the operating system or software to install the latest version of the operating system or software. Manually copying the update makes it difficult to avoid software piracy. Updates that require real time network connectivity with the download server are not secure because the connection to the network may result in malware attacks. Thus, there exists a need to overcome at least one of the preceding deficiencies and limitations of the related art.

BRIEF SUMMARY

Embodiments of the present invention provide a method of automatically and securely updating software on a virtual machine. The method comprises:

a computer system running a hypervisor detecting that a virtual machine (VM) is coming online in a virtualized server;

the computer system running the hypervisor determining a current version of the software that is installed on the VM;

the computer system running the hypervisor determining that the current version does not match an updated version of the software available from a remote update server via a network;

the computer system running the hypervisor receiving the updated version of the software from the remote update server and via the network;

the computer system running the hypervisor receiving a confirmation indicating that the updated version of the software is installed on the VM, wherein the steps of detecting that the VM is coming online, determining the current version that is installed on the VM, determining that the current version does not match the updated version, receiving the updated version via the network, and receiving the confirmation are performed without the VM being connected to the network; and in response to the receiving the confirmation, the computer system connecting the VM to the network.

A system, program product and a process for supporting computing infrastructure where the process provides at least one support service are also described and claimed herein.

The present invention provides automatic and secure updates of software installed on a virtual machine, prior to the virtual machine being connected to a network, thereby avoiding virus infections when the virtual machine is connected to the network and further avoiding software piracy issues that result from manual updates.

DETAILED DESCRIPTION

Overview

Embodiments of the present invention may provide secure updates of software and/or an operating system running on a virtual machine, where a hypervisor-based proxy server receives the updates via a network and pushes the updates to the virtual machine. The updates are obtained without requiring the virtual machine to be connected to the network, thereby avoiding vulnerabilities to attack when the virtual machine is connected to the network. Furthermore, the updates do not rely on copying updates manually. Embodiments of the present invention may also securely provide configuration information for a virtual machine, where a hypervisor-based proxy server receives the configuration information via a network and the virtual machine is not connected to the network.

In one embodiment, a hypervisor downloads the updates of the software and/or operating system to be run on a virtual machine, and the hypervisor stores the updates in a mounted drive. The virtual machine may detect the updates on the mounted drive and in response, update the software and/or operating system.

System for Configuring and Updating Virtual Machines

Figure 1:
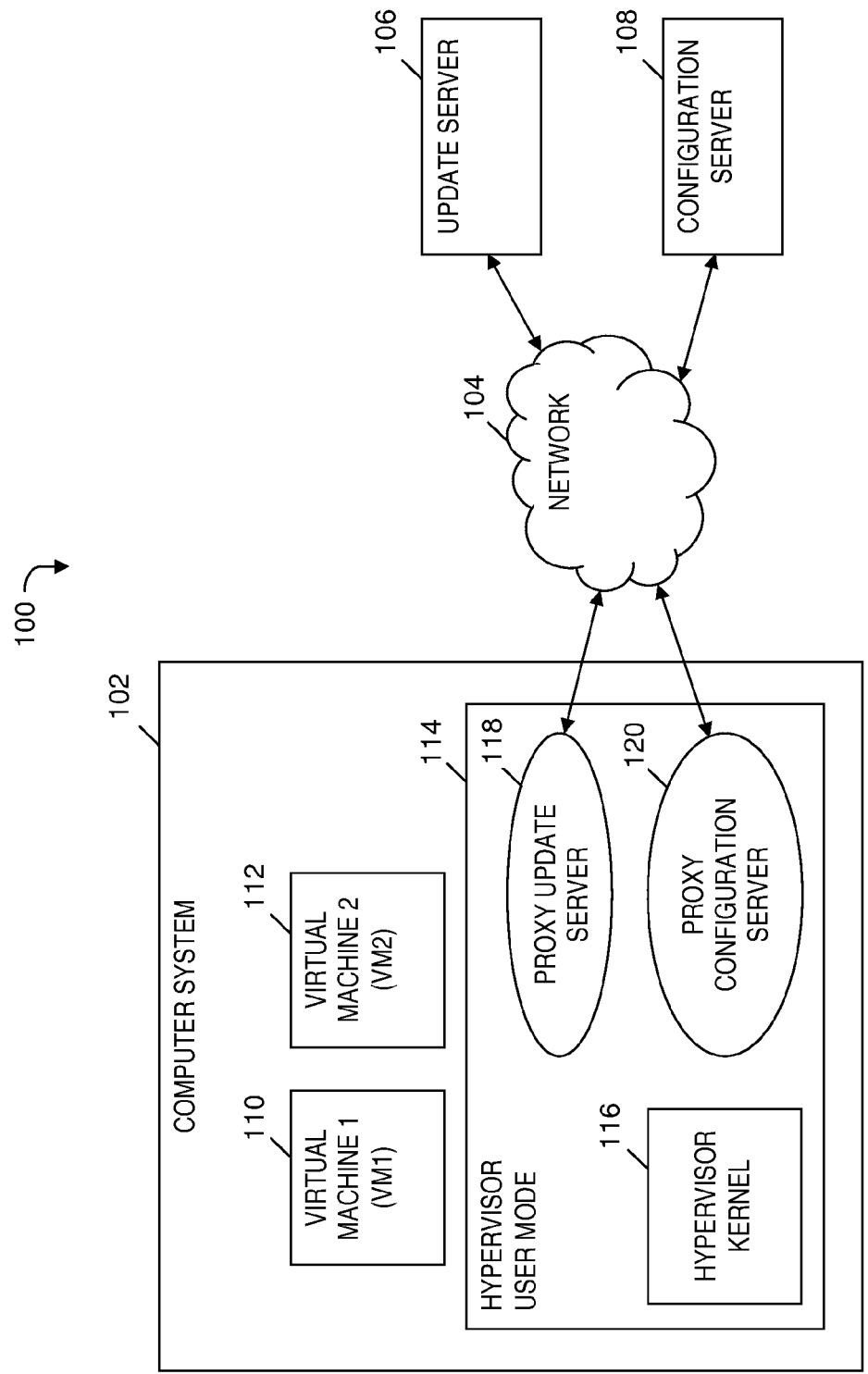
FIG. 1 is a block diagram of a system for automatically and securely configuring and updating virtual machines, in accordance with embodiments of the present invention.

FIG. 1 is a block diagram of a system for automatically and securely configuring and updating virtual machines, in accordance with embodiments of the present invention. System 100 includes a computer system 102, a network 104 (e.g., the Internet), an update server computer system 106 and a configuration server computer system 108. Computer system 102 may include virtual machine 110 (VM1) and virtual machine 112 (VM2). Computer system 102 may be a virtualized server. As depicted in FIG. 1, VM1 and VM2 are offline (i.e., not connected to network 104). Although FIG. 1 depicts two virtual machines VM1 and VM2 in computer system 102, embodiments of the present invention contemplate that computer system 102 may include one or more other virtual machines not shown in FIG. 1. In an alternate embodiment, computer system 102 includes one virtual machine VM1 instead of VM1 and VM2.

Computer system 102 includes a hypervisor user mode 114 (a.k.a. hypervisor), which includes a hypervisor kernel 116, a proxy update server 118, and a proxy configuration server 120. VM1 and VM2 (and any other virtual machine not shown) run over hypervisor kernel 116. Program code in hypervisor kernel 116 provides the proxy updated server 118 and proxy configuration server 120, and allows the hypervisor to communicate with the virtual machines, including VM1 and VM2. In one embodiment, hypervisor kernel 116 includes application programming interfaces (APIs) that provide a tunnel that allows communication between the virtual machines VM1 and VM2 and the hypervisor kernel. As one example, the APIs may be modifications of APIs that pass packets in VMsafe®, which is a software tool for packet inspection in a virtualized environment. VMsafe® is offered by VMware, Inc. located in Palo Alto, Calif. An interface provided by the VMsafe tool appears to VM1 and VM2 virtually as a mount or network connectivity, but the underlying infrastructure assures isolation from the network or the mount. The present invention, however, is not limited to the virtualized environment provided by products offered by VMware, Inc.; instead, the present invention contemplates updates occurring in any virtualized operating system environment.

In response to a virtual machine (e.g., VM1) coming online and while the virtual machine is not connected to the network 104, a need for a software or operating system update is determined via the aforementioned communication functionality between the virtual machine and hypervisor kernel 116, and the hypervisor kernel 116 directs the proxy update server 118 to receive an update of the software or operating system from update server 106 via network 104. The virtual machine detects and installs the received update to update the software or operating system. After the update is installed on the virtual machine, the hypervisor connects the virtual machine to network 104. In one embodiment, the hypervisor kernel 116 stores the received update in a mounted drive and the virtual machine detects the update on the mounted drive.

Also in response to the virtual machine (e.g., VM1) coming online and while the virtual machine is not connected to network 104, a need is determined for configuration information about the virtual machine, and the need for the configuration information is determined via the aforementioned communication functionality between the virtual machine and hypervisor kernel 116. Configuration information may be, for example, an Internet Protocol (IP) address associated with a virtual machine. Similar to the reception of the software update, the hypervisor kernel 116 may direct proxy configuration server 120 to receive the configuration information and the virtual machine detects and installs the received configuration information. After the configuration information is installed on the virtual machine, the hypervisor connects the virtual machine to network 104. In one embodiment, hypervisor kernel 116 stores the received configuration information in a mounted drive and the virtual machine detects the configuration information on the mounted drive.

The functionality of the components of system 100 is described in more detail in the discussion presented below relative to FIGS. 3A and 3B.

Figure 2:
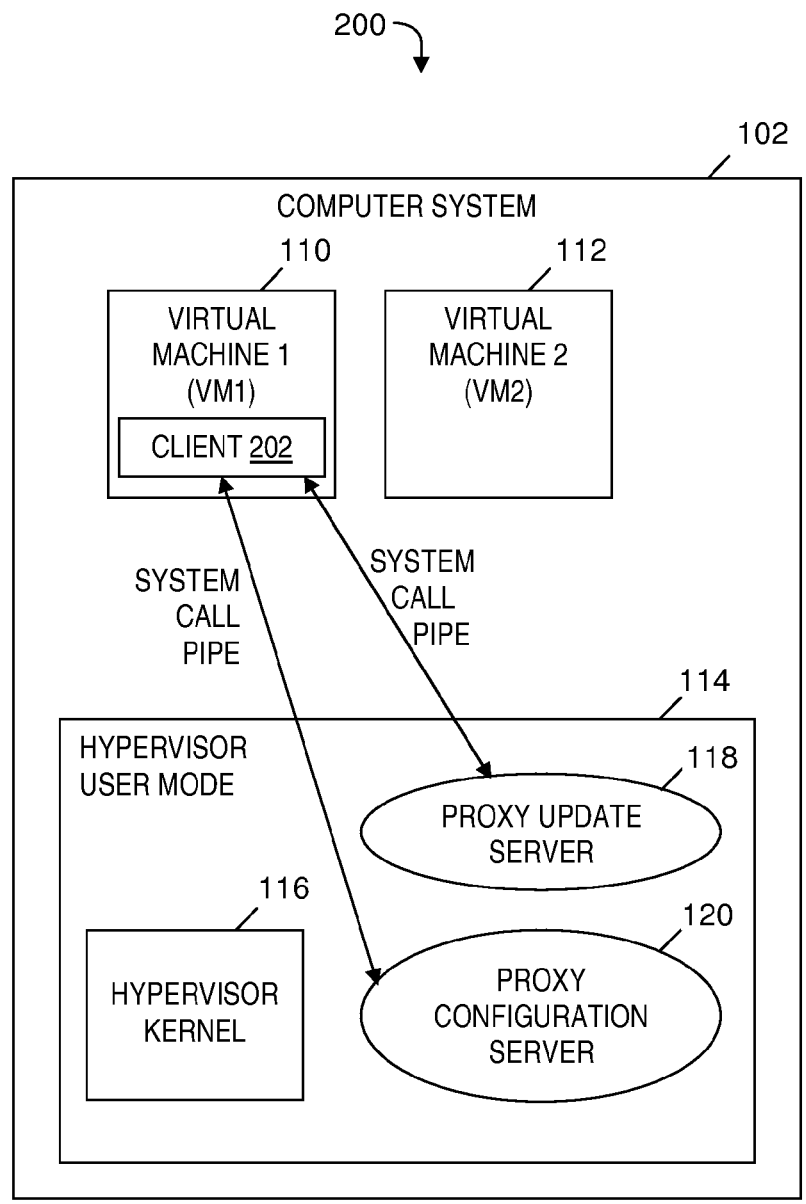
FIG. 2 is a block diagram of a client running as a kernel module in a virtual machine in the system of FIG. 1, in accordance with embodiments of the present invention.

FIG. 2 is a block diagram of a client running as a kernel module in a virtual machine in the system of FIG. 1, in accordance with embodiments of the present invention. System 200 includes the computer system 102, virtual machines 110 and 112 (i.e., VM1 and VM2), hypervisor user mode 114, hypervisor kernel 116, proxy update server 118, and proxy configuration server 120, each having the functionality described above relative to FIG. 1 and described below relative to FIGS. 3A-3B. In addition, system 200 depicts a client application 202 running as a kernel module in VM1. Client 202 receives updates to software and/or an operating system via a system call pipe to proxy update server 118. Client 202 also receives configuration information about the software and/or operating system via another system call pipe to proxy configuration server 120. In one embodiment, client 202 receives the updates to the software and/or operating system and the configuration information by using a novel hardware device (a.k.a. update/configuration device) that is enumerated by the virtual machine hardware as a configuration and updated device. The update/configuration device may be implemented as a network controller.

Process for Configuring and Updating Virtual Machines

Figure 3A:
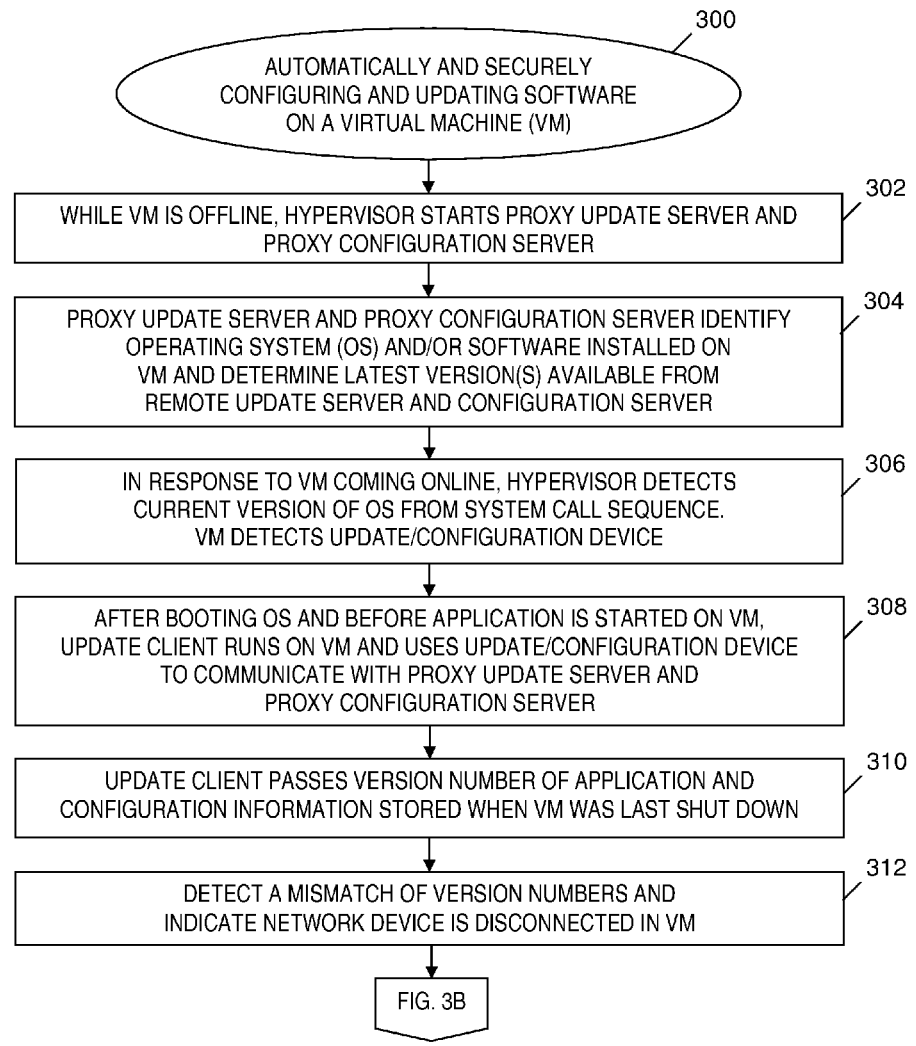
FIGS. 3A-3B depict a flowchart of a process for automatically and securely configuring and updating virtual machines in the system of FIG. 1, in accordance with embodiments of the present invention.
Figure 3B:
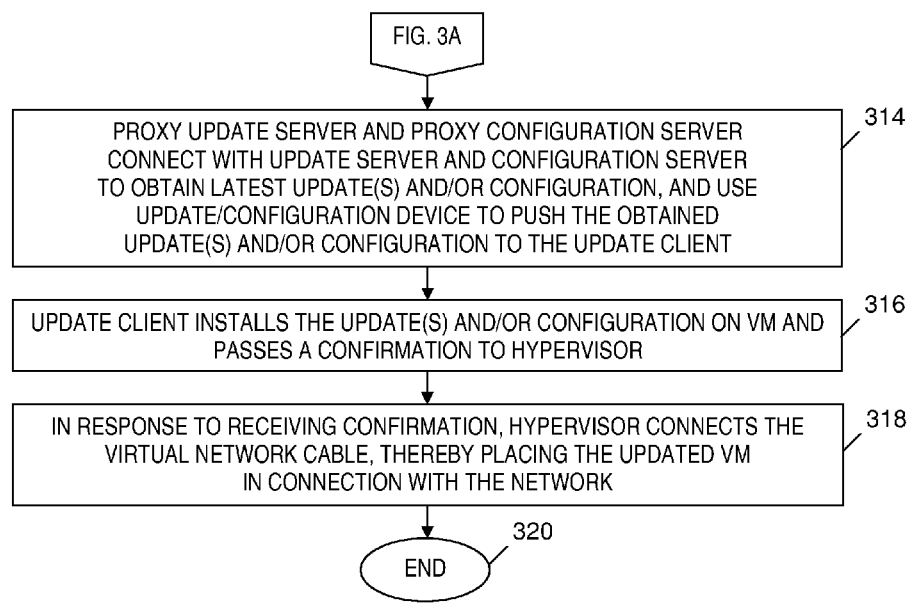

FIGS. 3A-3B depict a flowchart of a process for automatically and securely configuring and updating virtual machines in the system of FIG. 1, in accordance with embodiments of the present invention. The process for automatically and securely configuring and updating software and/or an operating system on the virtual machine VM1 starts at step 300 in FIG. 3A. Although this section refers to an update and configuration of VM1, the present invention contemplates using the process of FIGS. 3A-3B to update and configure any virtual machine included in system 100 (see FIG. 1) and in communication with proxy update server 118 (see FIG. 1) and proxy configuration server 120 (see FIG. 1).

In step 302, while VM1 is in an offline state and not connected to network 104 (see FIG. 1), the hypervisor kernel 116 (see FIG. 1) starts proxy update server 118 (see FIG. 1) and proxy configuration server 120 (see FIG. 1).

In step 304, the proxy update server 118 (see FIG. 1) and proxy configuration server 120 (see FIG. 1) identify a software application and/or an operating system installed on VM1, and determine the latest version(s) (i.e., latest update (s)) of the identified software and/or operating system. The latest version(s) are determined by the proxy servers 118 and 120 (see FIG. 1) communicating with update server 106 (see FIG. 1) and configuration server 108 (see FIG. 1), respectively, via network 104 (see FIG. 1). For example, if VM1 has operating system XYZ offered by ABC Corporation, then the proxy update server connects to the ABC Corporation's update server via network 104 (see FIG. 1) to receive an identification of the latest version of operating system XYZ.

After step 304 and prior to step 306, VM1 starts and comes online. While coming online, VM1 boots up its operating system. In step 306 and in response to VM1 coming online, hypervisor kernel 116 (see FIG. 1) detects the current version of the operating system of VM1. The hypervisor kernel 116 (see FIG. 1) detects the current operating system version from the system call sequence used as the operating system of VM1 boots up. Step 306 also includes VM1 detecting new virtualized hardware referred to herein as an update/configuration device, which may control hypervisor kernel 116 (see FIG. 1). The update/configuration device acts as a pipe or channel for passing information between a virtual machine and hypervisor kernel. In one embodiment, the update/configuration device is a mounted drive that is mounted by the hypervisor in response to the hypervisor completing the initial handshake with all known interrupts. The mounted drive may be mounted to computer system 102 (see FIG. 1). The mounted drive may be a virtualized mounted drive that is implemented with application programming interfaces (APIs).

Step 308 occurs after the operating system of VM1 completes its booting up process and before a software application is started on VM1. In step 308, update client (i.e., client 202 in FIG. 2) runs on VM1 and uses the update/configuration device to communicate with proxy update server 118 (see FIG. 1) and proxy configuration server 120 (see FIG. 1). The communication with the proxy servers 118 and 120 (see FIG. 1) in step 308 uses a mechanism based on the particular implementation of the update/configuration device. The mechanism for communication with the proxy servers may be, for example, a socket or shared memory system calls. In one embodiment, the communication in step 308 is provided by the update/configuration device acting as the system call pipe depicted in FIG. 2.

Step 308 may also include the update/configuration device sending information via the hypervisor kernel 116 (see FIG. 1) to the update server 106 (see FIG. 1) and/or the configuration server 108 (see FIG. 1). The information sent by the update/configuration device may be a token associated with a license for an update or other information about a virtual machine that is required by update server 106 (see FIG. 1) and/or configuration server 108 (see FIG. 1).

In step 310, client 202 (see FIG. 2) passes to the hypervisor kernel 116 (see FIG. 1) the version number of the software application and associated configuration information as the version number was stored as a result of the last time (i.e., the most recent preceding time) VM1 was shut down to an offline state. In one embodiment, the passing of the version number in step 310 is provided by the update/configuration device acting as the system call pipe depicted in FIG. 2.

After step 310 and prior to step 312, hypervisor kernel 116 (see FIG. 1) determines that the version number passed in step 310 does not match the version determined in step 304. At the initiation of step 312, the booting process of VM1 coming online is not yet complete. In step 312 and subsequent to determining the mismatch between the version number passed in step 310 and the version determined in step 304, VM1 queries for a start-up of network 104 (see FIG. 1). In response to the VM1 querying for the start-up of the network, hypervisor kernel 116 (see FIG. 1) indicates to VM1 that network and removable devices are disconnected from the network 104 (see FIG. 1) (i.e., indicates that VM1 does not have access to network 104 in FIG. 1). Thus, the hypervisor ensures that a software application starting on VM1 after the operating system of VM1 completes its mount boot sequence sees the network devices and other removable devices as being disconnected from network 104 (see FIG. 1), thereby preventing VM1 from being infected with vulnerabilities that require a connection to VM1 through the network. As the application starts on VM1, interrupts are enabled, but the interrupts see the network and other removable devices as disconnected from network 104 (see FIG. 1) and there is no activity on Interrupt Service Registers (ISRs). In response to step 312 being completed, the booting of VM1 is complete and VM1 is in a mode of updating the software and/or the operating system, but VM1 is not yet connected to network 104 (see FIG. 1). After step 312, the configuring and updating process continues in FIG. 3B.

In step 314 in FIG. 3B, proxy update server 118 (see FIG. 1) and proxy configuration server 120 (see FIG. 1) connect with update server 106 (see FIG. 1) and configuration server 108 (see FIG. 1), respectively, and obtain the latest update(s) and latest configuration information for the software and/or operating system being updated on VM1. After obtaining the aforementioned latest update(s) and configuration information, proxy servers 118 and 120 (see FIG. 1) use the update/configuration device to push the latest update(s) and configuration information to the client 202 (see FIG. 2). At the time of step 314, VM1 is still not connected to network 104 (see FIG. 1).

In step 316, client 202 (see FIG. 2) installs the aforementioned latest update(s) and configuration information on VM1 and passes to the hypervisor a confirmation that indicates the installation of the update(s) and configuration information. The hypervisor subsequently receives the confirmation. At the time of step 316, VM1 is still not connected to network 104 (see FIG. 1). In one embodiment, step 316 includes VM1 detecting the latest update(s) and configuration information on the mounted drive and subsequently updating the software and operating system on VM1 with the detected update(s).

In step 318 and in response to the hypervisor receiving the confirmation, the hypervisor connects a virtual network cable, thereby placing the updated VM1 in connection with network 104 (see FIG. 1). The process of automatically and securely configuring and updating software and/or an operating system on a virtual machine ends at step 320. It should be noted that the connectivity of the proxy servers 118 and 120 (see FIG. 1) to network 104 (see FIG. 1) is functional throughout the process of FIGS. 3A-3B, thereby allowing for dynamic updates of software applications and/or operating systems at any time, while still ensuring that the updates are secure because the hypervisor controls when VM1 is connected to the network (i.e., at step 318).

In alternate embodiments, the process of FIGS. 3A-3B may be modified to update software and/or an operating system on VM1, without updating configuration information. In other alternate embodiments, the process of FIGS. 3A-3B may be modified to update configuration information without other updates to software or to an operating system on VM1.

In one embodiment, all licenses for the updates to software installed on the virtual machines are configured to the hypervisor instead of to the virtual machine. The hypervisor maintains one token for each license and these tokens are validated by a license server.

Computer System

Figure 4:
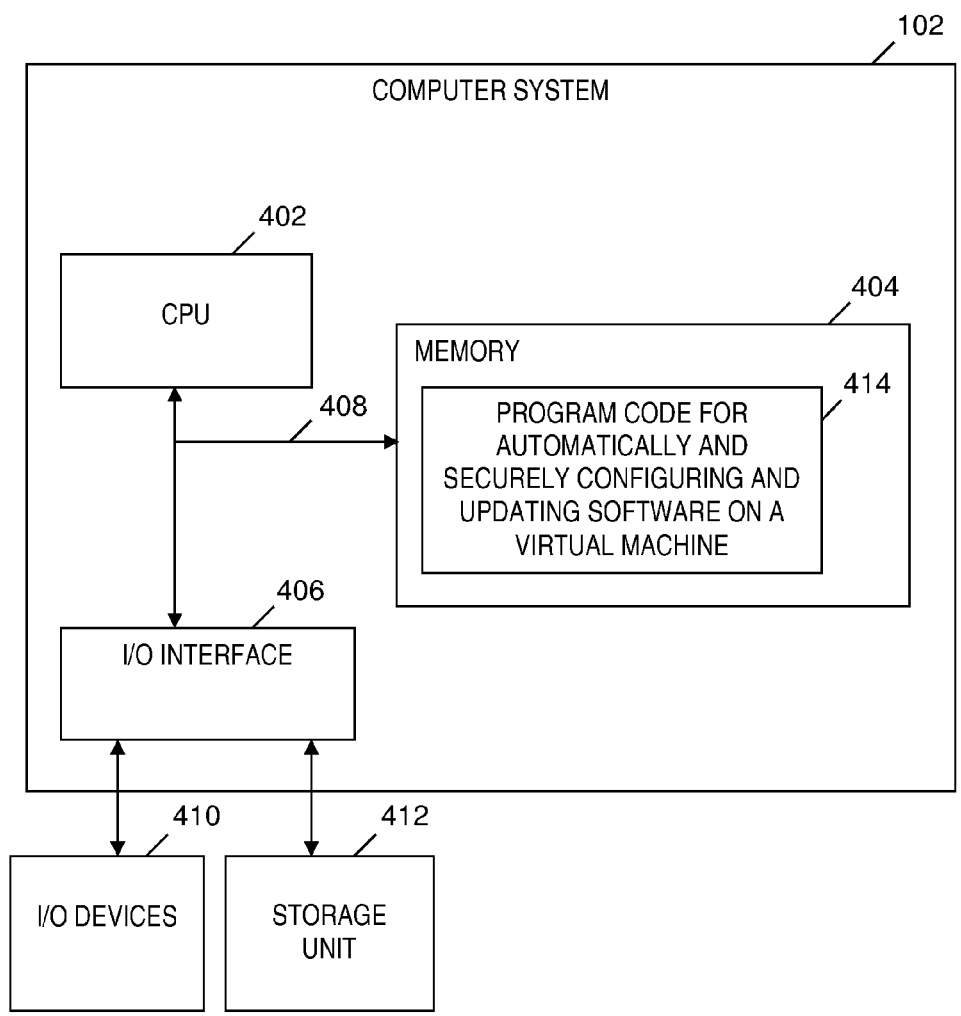
FIG. 4 is a block diagram of a computer system that is included in the system of FIG. 1 and that implements the process of FIGS. 3A-3B, in accordance with embodiments of the present invention.

FIG. 4 is a block diagram of a computer system that is included in the system of FIG. 1 and that implements the process of FIGS. 3A-3B, in accordance with embodiments of the present invention. Computer system 102 generally comprises a central processing unit (CPU) 402, a memory 404, an input/output (I/O) interface 406, and a bus 408. Further, computer system 102 is coupled to I/O devices 410 and a computer data storage unit 412. CPU 402 performs computation and control functions of computer system 102, including carrying out instructions included in program code 414 for automatically and securely configuring and updating a software application and/or an operating system on a virtual machine that is not connected to a network, where the instructions are carried out by CPU 402 via memory 404. CPU 402 may comprise a single processing unit, or be distributed across one or more processing units in one or more locations (e.g., on a client and server).

Memory 404 may comprise any known computer-readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, comprising one or more types of data storage, or be distributed across a plurality of physical systems in various forms. Further, memory 404 can include data distributed across, for example, a local area network (LAN) or a wide area network (WAN).

I/O interface 406 comprises any system for exchanging information to or from an external source. I/O devices 410 comprise any known type of external device, including a display device (e.g., monitor), keyboard, mouse, printer, speakers, handheld device, facsimile, etc. Bus 408 provides a communication link between each of the components in computer system 102, and may comprise any type of transmission link, including electrical, optical, wireless, etc.

I/O interface 406 also allows computer system 102 to store information (e.g., data or program instructions such as program code 414) on and retrieve the information from computer data storage unit 412 or another computer data storage unit (not shown). Computer data storage unit 412 may comprise any known computer-readable storage medium, which is described below. For example, computer data storage unit 412 may be a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are carried out by CPU 402 via memory 404 to automatically and securely configure and update a software application and/or an operating system on a virtual machine that is not connected to a network.

Further, memory 404 may include other systems not shown in FIG. 4, such as an operating system (e.g., Linux) that runs on CPU 402 and provides control of various components within and/or connected to computer system 102. Memory 404 may also include the hypervisor 114 (see FIG. 1) and hypervisor kernel 116 (see FIG. 1) and program code having instructions that are carried out by CPU 402 to provide the functionality of proxy update server 118 (see FIG. 1) and proxy configuration server 120 (see FIG. 1).

Storage unit 412 and/or one or more other computer data storage units (not shown) that are coupled to computer system 102 may store program code 414 and other program code used by the update/configuration device described above relative to FIGS. 3A-3B.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 404 and/or computer data storage unit 412) having computer-readable program code (e.g., program code 414) embodied or stored thereon.

Any combination of one or more computer-readable mediums (e.g., memory 404 and computer data storage unit 412) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 414) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 414) embodied on a computer-readable medium may be transmitted using any appropriate medium, including but not limited to wireless, wireline, optical fiber cable, RF, etc., or any suitable combination of the foregoing.

Computer program code (e.g., program code 414) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 4. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 3A-3B) and/or block diagrams of methods, apparatus (systems) (e.g., FIG. 1, FIG. 2, and FIG. 4), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 414). These computer program instructions may be provided to a processor (e.g., CPU 402) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer-readable medium (e.g., memory 404 or computer data storage unit 412) that can direct a computer (e.g., computer system 102), other programmable data processing apparatus, or other devices to function in a particular manner, such that the instructions (e.g., program 414) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 414) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of automatically and securely configuring and updating a software application and/or an operating system on a virtual machine that is not connected to a network. Thus, an embodiment of the present invention discloses a process for supporting computer infrastructure, wherein the process comprises providing at least one support service for at least one of integrating, hosting, maintaining and deploying computer-readable code (e.g., program code 414) in a computer system (e.g., computer system 102) comprising a processor (e.g., CPU 402), wherein the processor carries out instructions contained in the code causing the computer system to perform a method of automatically and securely configuring and updating a software application and/or an operating system on a virtual machine that is not connected to a network.

In another embodiment, the invention provides a method that performs the process steps of the invention on a subscription, advertising and/or fee basis. That is, a service provider, such as a Solution Integrator, can offer to create, maintain, support, etc. a process of automatically and securely configuring and updating a software application and/or an operating system on a virtual machine that is not connected to a network. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 3A-3B and the block diagrams in FIG. 1, FIG. 2 and FIG. 4 illustrate the architecture, functionality, and operation of possible implementations of systems, methods, and computer program products according to various embodiments of the present invention. In this regard, each block in the flowchart or block diagrams may represent a module, segment, or portion of code (e.g., program code 414), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method of automatically and securely updating software on a virtual machine, the method comprising:
   a computer system determining that a current version of the software on the virtual machine (VM) in the computer system does not match an updated version of the software, with a booting up of an operating system installed on the VM being initiated but not completed;
   by running the VM, the computer system querying for a start-up of a network to which a proxy update server in the computer system is connected;
   in response to the step of querying and by running a hypervisor, the computer system indicating to the VM that the VM does not have access to the network by indicating to the VM that network devices and removable devices are disconnected from the network, with the proxy update server being connected to the network;
   subsequent to the step of determining that the current version of the software does not match the updated version of the software, and by running the VM, the computer system completing the booting up of the operating system and the VM entering a mode of updating the software and the operating system, with the proxy update server being connected to the network and without the VM being connected to the network;
   the computer system downloading the updated version of the software and an updated version of the operating system from a remote update server and via the network, storing the updated versions of the software and the operating system in a virtualized mounted drive, and pushing the updated versions of the software and the operating system to the VM by using the virtualized mounted drive, with the proxy update server being connected to the network and without the VM being connected to the network;
   the computer system installing the updated versions of the software and the operating system on the VM to replace the current version of the software and a current version of the operating system, respectively, with the proxy update server being connected to the network and without the VM being connected to the network;
   using the virtualized mounted drive, the computer system receiving a confirmation indicating that the updated versions of the software and the operating system are installed on the VM, with the proxy update server being connected to the network and without the VM being connected to the network;
   based in part on the steps of indicating to the VM that the network devices and the removable devices are disconnected from the network, completing the booting up, entering the mode of updating, downloading the updated versions of the software and the operating system, storing the updated versions of the software and the operating system, pushing the updated versions of the software and the operating system to the VM using the virtualized mounted drive, and installing the updated versions of the software and the operating system being performed with the proxy update server being connected to the network and without the VM being connected to the network, the computer system providing an update of the software and operating system dynamically via a connectivity of the proxy update server to the network and preventing the VM from being infected with a virus as a result of the update of the software and the operating system, the virus requiring a connection to the VM through the network to infect the VM; and in response to the step of receiving the confirmation and subsequent to the step of providing the update of the software and operating system, the computer system connecting the VM to the network.

2. The method of claim 1, further comprising:
the proxy update server connecting with the remote update server via the network;
the proxy update server receiving the updated version of the software from the remote update server via the network; and
the proxy update server pushing the updated version of the software to the VM based on application programming interfaces (APIs) in the hypervisor providing tunneling between the VM and the proxy update server.

3. The method of claim 1, further comprising:
by running the hypervisor, the computer system determining that configuration information of the software installed on the VM requires an update of the configuration information, which includes an Internet Protocol address of the VM;
by running the hypervisor, the computer system receiving the update of the configuration information from a remote configuration server and via the network; and
by running the hypervisor, the computer system receiving a second confirmation from a client application indicating that the update of the configuration information is installed on the VM, wherein the steps of determining that the configuration information requires the update of the configuration information, receiving the update of the configuration information, and receiving the second confirmation are performed without the VM being connected to the network, and wherein the step of connecting the VM to the network is further in response to the step of receiving the second confirmation.

4. The method of claim 1, further comprising:
prior to the step of determining the current version of the software does not match the updated version of the software, the computer system running the hypervisor to start a proxy update server in the computer system, the proxy update server connected to the network;
by running the proxy update server, the computer system identifying the operating system installed on the VM, the VM not connected to the network; and
the computer system determining the updated version of the operating system and the updated version of the software from a communication between the proxy update server and the remote update server via the network, with the proxy update server being connected to the network and without the VM being connected to the network.

5. The method of claim 1, further comprising:
the computer system detecting that the VM is coming online in a virtualized server, the VM coming online including the booting up of the operating system installed on the VM by using a system call sequence, with the proxy update server being connected to the network and without the VM being connected to the network; and in response to the step of the VM coming online and by running the hypervisor, the computer system detecting the current version of the operating system from the system call sequence, with the proxy update server being connected to the network and without the VM being connected to the network.

6. The method of claim 1, further comprising:
by running the hypervisor, the computer system completing an initial handshake with all interrupts, with the proxy update server being connected to the network and without the VM being connected to the network;
in response to the step of completing the initial handshake with all interrupts, the computer system mounting the virtualized mounted drive implemented by application program interfaces (APIs), with the proxy update server being connected to the network and without the VM being connected to the network; and
using the virtualized mounted drive, the computer system sending to the remote update server a token associated with a license for updating the software, the token required by the remote update server, with the proxy update server being connected to the network and without the VM being connected to the network.

7. The method of claim 1, further comprising:
using the virtualized mounted drive acting as a system call pipe, the computer system passing a current version number of the software to the hypervisor, the current version number specifying the current version of the software, with the proxy update server being connected to the network and without the VM being connected to the network; and
in response to the step of passing the current version number of the software to the hypervisor, the computer system determining that the current version number of the software does not indicate the updated version of the software determined from a communication with the remote update server via the network, with the booting up of the operating system not yet being completed, with the proxy update server being connected to the network, and without the VM being connected to the network.

8. The method of claim 1, further comprising:
providing at least one support service for at least one of creating, integrating, hosting, maintaining, and deploying computer-readable program code in the computer system, the program code being executed by a processor in the computer system to implement the steps of determining that the current version of the software does not match the updated version of the software, querying for the start-up of the network, indicating to the VM that the VM does not have access to the network, completing the booting up of the operating system, entering the mode of updating the software and the operating system, downloading the updated version of the software and the updated version of the operating system, storing the updated versions of the software and the operating system, pushing the updated versions of the software and the operating system to the VM, installing the updated versions of the software and the operating system on the VM, receiving the confirmation, providing the update of the software and operating system, and connecting the VM to the network.

9. A computer program product, comprising:
a computer-readable, tangible storage device coupled to a processor of a computer system; and
computer-readable program code stored in the computer-readable, tangible storage device, the computer-readable program code containing instructions that are executed by the processor to implement a method of automatically and securely updating software on a virtual machine, the method comprising:

the computer system determining that a current version of the software on the virtual machine (VM) in the computer system does not match an updated version of the software, with a booting up of an operating system installed on the VM being initiated but not completed;

by running the VM, the computer system querying for a start-up of a network to which a proxy update server in the computer system is connected;

in response to the step of querying and by running a hypervisor, the computer system indicating to the VM that the VM does not have access to the network by indicating to the VM that network devices and removable devices are disconnected from the network, with the proxy update server being connected to the network;

subsequent to the step of determining that the current version of the software does not match the updated version of the software, and by running the VM, the computer system completing the booting up of the operating system and the VM entering a mode of updating the software and the operating system, with the proxy update server being connected to the network and without the VM being connected to the network;

the computer system downloading the updated version of the software and an updated version of the operating system from a remote update server and via the network, storing the updated versions of the software and the operating system in a virtualized mounted drive, and pushing the updated versions of the software and the operating system to the VM by using the virtualized mounted drive, with the proxy update server being connected to the network and without the VM being connected to the network;

the computer system installing the updated versions of the software and the operating system on the VM to replace the current version of the software and a current version of the operating system, respectively, with the proxy update server being connected to the network and without the VM being connected to the network;

using the virtualized mounted drive, the computer system receiving a confirmation indicating that the updated versions of the software and the operating system are installed on the VM, with the proxy update server being connected to the network and without the VM being connected to the network;

based in part on the steps of indicating to the VM that the network devices and the removable devices are disconnected from the network, completing the booting up, entering the mode of updating, downloading the updated versions of the software and the operating system, storing the updated versions of the software and the operating system, pushing the updated versions of the software and the operating system to the VM using the virtualized mounted drive, and installing the updated versions of the software and the operating system being performed with the proxy update server being connected to the network and without the VM being connected to the network, the computer system providing an update of the software and operating system dynamically via a connectivity of the proxy update server to the network and preventing the VM from being infected with a virus as a result of the update of the software and the operating system, the virus requiring a connection to the VM through the network to infect the VM; and in response to the step of receiving the confirmation and subsequent to the step of providing the update of the software and operating system, the computer system connecting the VM to the network.

10. The program product of claim 9, wherein the method further comprises:

the proxy update server connecting with the remote update server via the network;

the proxy update server receiving the updated version of the software from the remote update server via the network; and the proxy update server pushing the updated version of the software to the VM based on application programming interfaces (APIs) in the hypervisor providing tunneling between the VM and the proxy update server.

11. The program product of claim 9, wherein the method further comprises:

by running the hypervisor, the computer system determining that configuration information of the software installed on the VM requires an update of the configuration information, which includes an Internet Protocol address of the VM;

by running the hypervisor, the computer system receiving the update of the configuration information from a remote configuration server and via the network; and by running the hypervisor, the computer system receiving a second confirmation from a client application indicating that the update of the configuration information is installed on the VM, wherein the steps of determining that the configuration information requires the update of the configuration information, receiving the update of the configuration information, and receiving the second confirmation are performed without the VM being connected to the network, and wherein the step of connecting the VM to the network is further in response to the step of receiving the second confirmation.

12. The program product of claim 9, wherein the method further comprises:

prior to the step of determining the current version of the software does not match the updated version of the software, the computer system running the hypervisor to start a proxy update server in the computer system, the proxy update server connected to the network;

by running the proxy update server, the computer system identifying the operating system installed on the VM, the VM not connected to the network; and the computer system determining the updated version of the operating system and the updated version of the software from a communication between the proxy update server and the remote update server via the network, with the proxy update server being connected to the network and without the VM being connected to the network.

13. The program product of claim 9, wherein the method further comprises:

the computer system detecting that the VM is coming online in a virtualized server, the VM coming online including the booting up of the operating system installed on the VM by using a system call sequence, with the proxy update server being connected to the network and without the VM being connected to the network; and in response to the step of the VM coming online and by running the hypervisor, the computer system detecting the current version of the operating system from the system call sequence, with the proxy update server being connected to the network and without the VM being connected to the network.

14. The program product of claim 9, wherein the method further comprises:

by running the hypervisor, the computer system completing an initial handshake with all interrupts, with the proxy update server being connected to the network and without the VM being connected to the network;

in response to the step of completing the initial handshake with all interrupts, the computer system mounting the virtualized mounted drive implemented by application program interfaces (APIs), with the proxy update server being connected to the network and without the VM being connected to the network; and using the virtualized mounted drive, the computer system sending to the remote update server a token associated with a license for updating the software, the token required by the remote update server, with the proxy update server being connected to the network and without the VM being connected to the network.

15. The program product of claim 9, wherein the method further comprises:

using the virtualized mounted drive acting as a system call pipe, the computer system passing a current version number of the software to the hypervisor, the current version number specifying the current version of the software, with the proxy update server being connected to the network and without the VM being connected to the network; and in response to the step of passing the current version number of the software to the hypervisor, the computer system determining that the current version number of the software does not indicate the updated version of the software determined from a communication with the remote update server via the network, with the booting up of the operating system not yet being completed, with the proxy update server being connected to the network, and without the VM being connected to the network.

16. A computer system comprising:

a central processing unit (CPU);

a memory coupled to the CPU;

a computer-readable, tangible storage device coupled to the CPU, the storage device containing instructions that are executed by the CPU via the memory to implement a method of automatically and securely updating software on a virtual machine, the method comprising:

the computer system determining that a current version of the software on the virtual machine (VM) in the computer system does not match an updated version of the software, with a booting up of an operating system installed on the VM being initiated but not completed;

by running the VM, the computer system querying for a start-up of a network to which a proxy update server in the computer system is connected;

in response to the step of querying and by running a hypervisor, the computer system indicating to the VM that the VM does not have access to the network by indicating to the VM that network devices and removable devices are disconnected from the network, with the proxy update server being connected to the network;

subsequent to the step of determining that the current version of the software does not match the updated version of the software, and by running the VM, the computer system completing the booting up of the operating system and the VM entering a mode of updating the software and the operating system, with the proxy update server being connected to the network and without the VM being connected to the network;

the computer system downloading the updated version of the software and an updated version of the operating system from a remote update server and via the network, storing the updated versions of the software and the operating system in a virtualized mounted drive, and pushing the updated versions of the software and the operating system to the VM by using the virtualized mounted drive, with the proxy update server being connected to the network and without the VM being connected to the network;

the computer system installing the updated versions of the software and the operating system on the VM to replace the current version of the software and a current version of the operating system, respectively, with the proxy update server being connected to the network and without the VM being connected to the network;

using the virtualized mounted drive, the computer system receiving a confirmation indicating that the updated versions of the software and the operating system are installed on the VM, with the proxy update server being connected to the network and without the VM being connected to the network;

based in part on the steps of indicating to the VM that the network devices and the removable devices are disconnected from the network, completing the booting up, entering the mode of updating, downloading the updated versions of the software and the operating system, storing the updated versions of the software and the operating system, pushing the updated versions of the software and the operating system to the VM using the virtualized mounted drive, and installing the updated versions of the software and the operating system being performed with the proxy update server being connected to the network and without the VM being connected to the network, the computer system providing an update of the software and operating system dynamically via a connectivity of the proxy update server to the network and preventing the VM from being infected with a virus as a result of the update of the software and the operating system, the virus requiring a connection to the VM through the network to infect the VM; and in response to the step of receiving the confirmation and subsequent to the step of providing the update of the software and operating system, the computer system connecting the VM to the network.

17. The computer system of claim 16, wherein the method further comprises:

the proxy update server connecting with the remote update server via the network;

the proxy update server receiving the updated version of the software from the remote update server via the network; and the proxy update server pushing the updated version of the software to the VM based on application programming interfaces (APIs) in the hypervisor providing tunneling between the VM and the proxy update server.

18. The computer system of claim 16, wherein the method further comprises:
- by running the hypervisor, the computer system determining that configuration information of the software installed on the VM requires an update of the configuration information, which includes an Internet Protocol address of the VM;
- by running the hypervisor, the computer system receiving the update of the configuration information from a remote configuration server and via the network; and
- by running the hypervisor, the computer system receiving a second confirmation from a client application indicating that the update of the configuration information is installed on the VM, wherein the steps of determining that the configuration information requires the update of the configuration information, receiving the update of the configuration information, and receiving the second confirmation are performed without the VM being connected to the network, and wherein the step of connecting the VM to the network is further in response to the step of receiving the second confirmation.

19. The computer system of claim 16, wherein the method further comprises:
- prior to the step of determining the current version of the software does not match the updated version of the software, the computer system running the hypervisor to start a proxy update server in the computer system, the proxy update server connected to the network;
- by running the proxy update server, the computer system identifying the operating system installed on the VM, the VM not connected to the network; and
- the computer system determining the updated version of the operating system and the updated version of the software from a communication between the proxy update server and the remote update server via the network, with the proxy update server being connected to the network and without the VM being connected to the network.

20. The computer system of claim 16, wherein the method further comprises:
- the computer system detecting that the VM is coming online in a virtualized server, the VM coming online including the booting up of the operating system installed on the VM by using a system call sequence, with the proxy update server being connected to the network and without the VM being connected to the network; and
- in response to the step of the VM coming online and by running the hypervisor, the computer system detecting the current version of the operating system from the system call sequence, with the proxy update server being connected to the network and without the VM being connected to the network.

\* \* \* \* \*